M. J. KIRBY.
SHOCK ABSORBER FOR VEHICLES.
APPLICATION FILED JUNE 22, 1914.
1,166,604.
Patented Jan. 4, 1916.
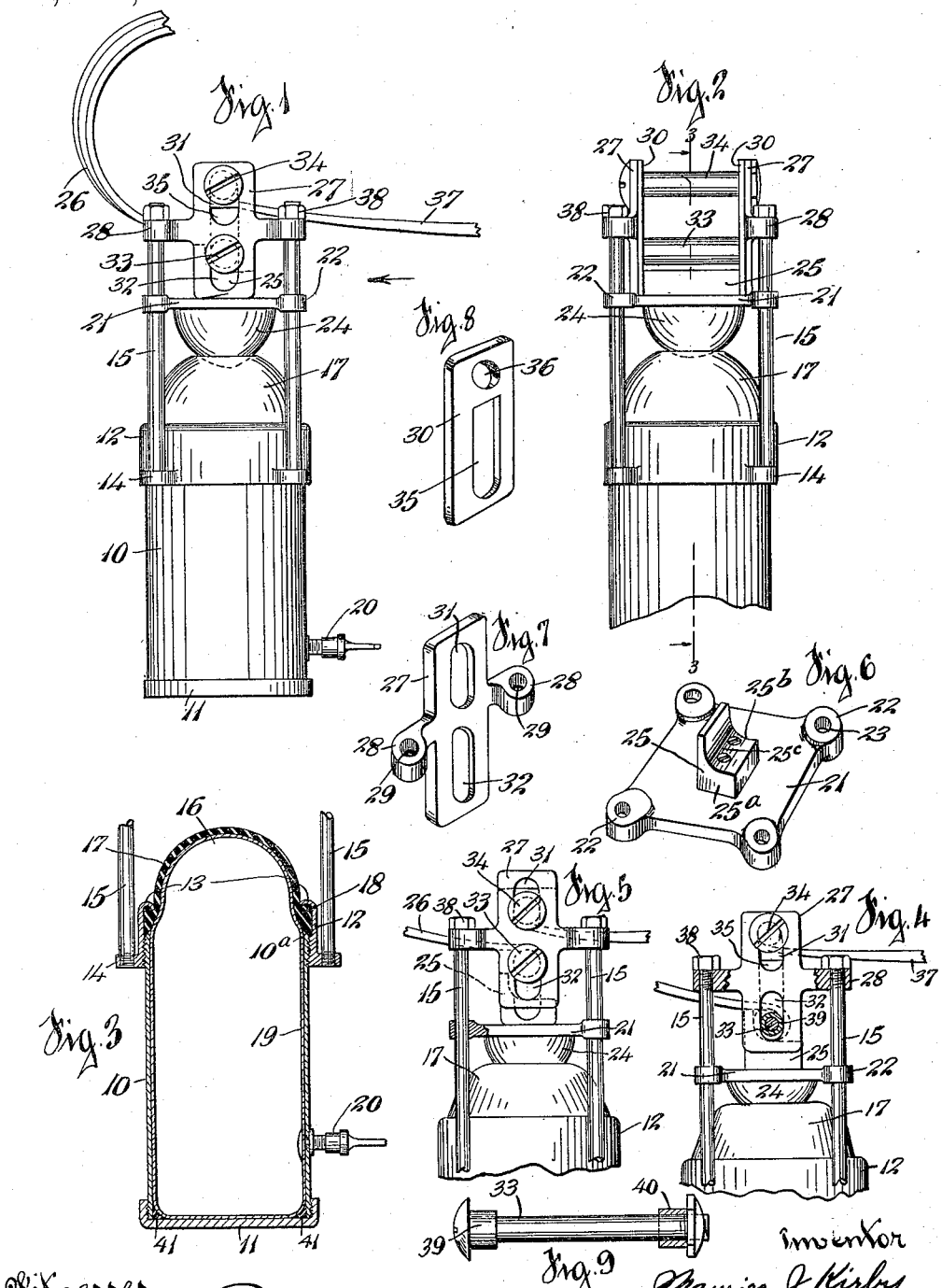

UNITED STATES PATENT OFFICE.

MAURICE J. KIRBY, OF CINCINNATI, OHIO, ASSIGNOR OF ONE-HALF TO ANTHONY M. SAUER, OF CINCINNATI, OHIO.

SHOCK-ABSORBER FOR VEHICLES.

1,166,604.   Specification of Letters Patent.   Patented Jan. 4, 1916.

Application filed June 22, 1914. Serial No. 846,413.

*To all whom it may concern:*

Be it known that I, MAURICE J. KIRBY, a citizen of the United States of America, and resident of Cincinnati, county of Hamilton, State of Ohio, have invented certain new and useful Improvements in Shock-Absorbers for Vehicles, of which the following is a specification.

This invention relates to shock absorbers for vehicles and has for an object to produce a shock absorber which will not only absorb shocks tending to cause movement of the vehicle body and running gear toward one another but also to produce a shock absorber which will absorb shocks caused by the rebound or reaction of the vehicle springs, in which the tendency of the vehicle body and the running gear is to move apart relatively to one another.

A further object is to produce a shock absorber in which improved means are employed for renewing the resilient members and for varying the degree of resiliency of these members.

These and other objects are attained in the device described in the following specification and illustrated in the accompanying drawings in which:—

Figure 1 is a side elevation of my shock absorber attached to the body and running gear springs of a vehicle. Fig. 2 is a front elevation of my shock absorber, looking in the direction indicated by the arrow in Fig. 1. Fig. 3 is a fragmental sectional view taken on line 3—3 of Fig. 2. Figs. 4 and 5 are fragmental side elevations of the operative portions located at the top of my device and showing these portions occupying different operative positions with relation to one another. Figs. 6, 7, 8 and 9 are views of details of my invention.

The device illustrated consists of a cylinder 10 which is closed at its lower end by means of a cap 11 and is provided at its upper end with a collar 12 which is screwed on to the upper end of the cylinder 10 and is provided with an inturned rim 13, shaped much after the manner of the ordinary clencher rims for pneumatic tires. This collar 12 is also provided with lugs 14 into which upwardly extending bolts 15 are screwed in order to carry the spring engaging and other operating parts of the device. Within the cylinder 10 a pneumatic cushion 16 is provided. This pneumatic cushion consists of a hemispherical compression member 17 having a beaded edge 18 adapted to engage the clencher rim 13 of the collar 12, an inner tube 19 which is provided with a valve 20 whereby the inner tube may be inflated to expand it within the cylinder 10 and compression member 17. The inner tube 19 is preferably made of rubber in much the same manner that the inner tubes of automobile tires are made, and the hemispherical member 17 is made of rubber reinforced with fabric or similar material in much the same manner that the casings of pneumatic tires are made. I have provided a rubber gasket 41 located at the bottom of the cylinder 10 and resting upon the head 11, for the purpose of preventing pinching or cracking of the material of the inner tube. In addition to this I have provided a bevel face 10$^a$ at the upper end of the cylinder 10 so that the lower point of the clencher bead 18 of the member 17 may be held in position as shown in Fig. 3, thereby preventing disengagement of the bead from the clencher rim 13 of the collar 12.

Engaging the upwardly extending bolts 15 is a plate 21 which is provided with lugs 22 having apertures 23 adapted to engage the bolts and to reciprocate thereon. A hemispherical extension 24 is provided on the plate 21 for the purpose of contacting the surface of the compression member 17. This plate is also provided with a block 25 which, in effect forms a seat for the bolt engaging end of the vehicle spring 26. Mounted on bolts 15 above the plate 21 are vertically extending plates 27 which are provided with lugs 28 having apertures 29 located therein for the purpose of engaging the bolts. These plates are located adjacent to the sides 25$^a$ and 25$^b$ of the block 25, but are spaced from the block 25 sufficiently to permit of a plate 30 entering between each plate 27 and the adjacent faces 25$^a$ of the block 25. Slots 31, 32 of equal length are provided in the plates 27 for the purpose of receiving bolts 33 and 34 which engage the looped ends of the body spring 26 and the running gear spring 37. Plates 30 are also provided with slots 35 through which the bolts 33 are adapted to pass and apertures 36 through which the bolts 34 are adapted to pass. It will thus be seen that with the plates in position, the slots 32 and 35 will register with one another and the slots 31 and apertures 36 will register with one another, so that bolt 33 carrying the end of spring 26 will occupy slots 32 and 35 and bolt 34 carrying the end of spring 37 will occupy slots 31 and apertures 36. It will thus be seen that when the vehicle running gear is subjected to a force which tends to lift it relatively to the body of the vehicle, the parts will be brought to the position illustrated in Fig. 4 in which spring 37 has moved upwardly with relation to spring 26, thereby causing bolt 34 which is normally in engagement with the top of slot 31, to lift plate 27 and cylinder 10, by being brought into engagement with the nuts 38 provided on bolts 15. Spring 26 in this position will be caused to engage the curved face 25° of the block 25, thereby preventing plate 21 from moving upwardly when the cylinder 10 is lifted by plates 27. This action causes hemispherical projection 24 to compress member 17, thereby compressing the air contained in inner tube 19 and absorbing the shock caused by such action. When the parts have been subjected to a force causing them to occupy the position shown in Fig. 4, it is usual for the reaction of the springs to cause the body of the vehicle to rebound with a tendency to break the springs and to leave the running gear. This action is prevented in my device by the reverse action of the plates 27 and 30 which will be brought to occupy the positions shown in Fig. 5, by means of bolts 33 34 located on the ends of the springs. In this position the spring 26 has brought bolt 33 to engage the upper ends of slots 32 in plates 27, and bolt 34, occupying apertures 36 in plates 30, is caused to force plate 21 downwardly while plates 27 are being moved upwardly to lift cylinder 10. This action produces compression of hemispherical member 17 and the air contained in inner tube 19, thereby effecting absorption of the shock occasioned by the rebound of the vehicle body and reaction of springs 26 and 37.

In the drawings I have illustrated my device attached to the body and running gear springs located at the rear of the vehicle, but it is to be understood that this device is also intended to be attached to the front springs of the vehicle as well as the rear springs for the purpose of absorbing shocks sustained by the front portions of the vehicle as well as the rear portions. In some vehicle constructions it will be necessary to attach the shock absorber in such a manner that one or the other of the bolts 33 and 34 are attached directly to the frame of the vehicle instead of to the spring as in other constructions. In this case the other of the bolts will of course be attached to the end of the spring which is usually attached to the end of the frame.

In order to facilitate operation of the device and to eliminate friction and consequent wear I have provided rollers 39 and 40 which are located at opposite ends of the bolts 33 and 34 and engage the slots 31, 32, 35 and apertures 36, so that when the plates 27 and 30 move relatively to one another and when the bolts 33, 34 move in the slots, the rollers 39 and 40 will roll over the edges of the slots and prevent the plates from becoming worn.

It will thus be seen that my device will absorb shocks which are caused by the vehicle wheels encountering obstructions or unevenness in the road surface as well as to absorb shocks occasioned by the rebound of the vehicle body and the recoil of springs 26 and 37.

Since I have constructed the resilient member of my shock absorber after the manner of clencher pneumatic tires in which the casing is secured by means of a bead engaging a clencher rim and in which an inflated inner tube is provided, it will be seen that these parts may be readily renewed when they burst or wear out and in which they may be as readily repaired as the casing and inner tube of an ordinary pneumatic automobile tire. In addition to this it will be seen that the degree of resiliency may be varied by increasing or decreasing the air pressure.

Having thus described my invention, what I claim is;

1. A shock absorber comprising an air cylinder closed at one end, an elastic hemispherical member adapted to close the opposite end of the cylinder, guide bars secured to the cylinder and extending to a point beyond the hemispherical member, a compression plate reciprocally mounted on the rods in contact with the member and adapted to be reciprocated thereon to compress the member, plates having slots formed therein mounted on the rods with their lower ends normally in contact with the compression plate, a second set of plates having slots formed therein, located adjacent to the plates of the first set, with the slots of both sets in registration, and means engaging the slots of both sets operatively connected with the relatively movable vehicle running gear and body, adapted to cause relative movement of the plates, whereby the compression plate will be caused to compress the hemispherical member upon relative movement in either direction of the vehicle running gear and body.

2. In a shock absorber for vehicles, the combination of a resilient member, a support for said resilient member, guide bars extending from the support to a point above the resilient member, a compression plate reciprocally mounted on the guide bars in contact with the resilient member, a set of plates connected with the guide rods and normally having their ends in engagement with the compression plate, each of said plates having two elongated superimposed slots, a second set of plates located adjacent to the plates of the first set, with their lower ends engaging the compression plate, each plate of said second set having an elongated slot formed therein at its lower end, adapted to register with the elongated slot at the lower end of its coöperating plate of the first set, and at its upper end having a circular aperture adapted to register with the elongated slot at the upper end of its coöperating plate of the first set, a bolt engaging the slots formed at the lower ends of the plates of both sets and connected with either the running gear portion or the body portion of the vehicle, and a bolt engaging the slots and circular apertures formed at the upper ends of the plates of both sets and connected with the other portions of the vehicle, whereby relative movement of the portions in either direction will cause the second set of plates to be moved to compress the resilient member.

In testimony whereof, I have hereunto subscribed my name this 8th day of June, 1914.

MAURICE J. KIRBY.

Witnesses:
WALTER F. MURRAY,
W. THORNTON BOGERT.

Copies of this patent may be obtained for five cents each, by addressing the "Commissioner of Patents, Washington, D. C."